United States Patent
Cho et al.

(10) Patent No.: US 9,695,068 B2
(45) Date of Patent: Jul. 4, 2017

(54) PRE-TREATING WATER WITH NON-THERMAL PLASMA

(71) Applicant: DREXEL UNIVERSITY, Philadelphia, PA (US)

(72) Inventors: Young I. Cho, Cherry Hill, NJ (US); Alexander Fridman, Philadelphia, PA (US); Alexander Rabinovich, Cherry Hill, NJ (US); Daniel J. Cho, Wayne, PA (US)

(73) Assignee: Drexel University, Philadelphia, PA (US)

( * ) Notice: Subject to any disclaimer, the term of this patent is extended or adjusted under 35 U.S.C. 154(b) by 670 days.

(21) Appl. No.: 14/071,990

(22) Filed: Nov. 5, 2013

(65) Prior Publication Data

US 2014/0124357 A1    May 8, 2014

Related U.S. Application Data

(60) Provisional application No. 61/723,004, filed on Nov. 6, 2012.

(51) Int. Cl.
*C02F 1/00* (2006.01)
*C02F 1/04* (2006.01)
(Continued)

(52) U.S. Cl.
CPC ............ *C02F 1/4608* (2013.01); *C02F 1/001* (2013.01); *C02F 1/04* (2013.01); *C02F 1/4602* (2013.01); *C02F 2201/46175* (2013.01)

(58) Field of Classification Search
None
See application file for complete search history.

(56) References Cited

U.S. PATENT DOCUMENTS

2010/0219136 A1* 9/2010 Campbell ............ C02F 1/4608
210/748.01
2011/0011801 A1    1/2011 Cho
(Continued)

FOREIGN PATENT DOCUMENTS

DK    WO 2011073170 A1 *  6/2011 ............... H05H 1/48
WO   WO 2007/147097 A2    12/2007
WO   WO 2011130162 A2 * 10/2011 ............... F22B 1/28

OTHER PUBLICATIONS

Dors, M., "Plasma for Water Treatment", Centre for Plasma and Laser Engineering, the Szewalski Institute of Fluid-Flow Machinery Polish Academy of Sciences, Gdansk, Poland, 2010, http://www.plastep.eu/fileadmin/dateien/Events/2011/110725_Summer_School/Plasma_water_treatment.
(Continued)

*Primary Examiner* — Krishnan S Menon
*Assistant Examiner* — Bradley R Spies
(74) *Attorney, Agent, or Firm* — Baker & Hostetler LLP

(57) ABSTRACT

The present invention consists of a method of pre-treatment of adulterated water for distillation, including adulterated water produced during hydraulic fracturing ("fracking") of shale rock during natural gas drilling. In particular, the invention is directed to a method of treating adulterated water, said adulterated water having an initial level of bicarbonate ion in a range of about 250 ppm to about 5000 ppm and an initial level of calcium ion in a range of about 500 ppm to about 50,000 ppm, said method comprising contacting the adulterated water with a non-thermal arc discharge plasma to produce plasma treated water having a level of bicarbonate ion of less than about 100 ppm. Optionally, the plasma treated water may be further distilled.

16 Claims, 12 Drawing Sheets

(51) Int. Cl.
*C02F 1/46* (2006.01)
*C02F 1/461* (2006.01)

(56) References Cited

U.S. PATENT DOCUMENTS

2011/0089115 A1* 4/2011 Lu .................... F28F 19/00
                                                    210/683
2013/0015159 A1* 1/2013 Kusano .................. H05H 1/48
                                                    216/67

OTHER PUBLICATIONS

Kim et al, "Concentration of Hydrogen Peroxide Generated by Gliding Arc Discharge and Inactivation of *E. coli* in Water", International Communications in Heat and Mass Transfer, Mar. 2013, 42, 5-10.

Yang et al, "Plasma Discharge in Water", Advances in Heat Transfer, 2010, 42, 179-292.

Yang et al, "Applications of Plasma Discharge for the Prevention of Mineral Fouling in Heat Exchangers", Presented at International Water Conference, Oct. 24-28, 2010, 13 pages.

Yang et al, "Application of Pulsed Spark Discharge for Calcium Carbonate Precipitation in Hardwater", Water Research, 2010, 44, 3659-3668.

Yang, "Mechanism of Calcium Ion Precipitation From Hard Water Using Pulsed Spark Discharges", Plasma Chem Plasma Process, 2011, 31, 51-66.

Gerrity et al, "An Evaluation of a Pilot-Scale Nonthermal Plasma Advanced Oxidation Process for Trace Organic Compound Degradation", Water Research, 2009, 1-12.

Gallagher et al, "Rapid Inactivation of Airborne Bacteria Using Atmospheric Pressure Dielectric Barrier Grating Discharge", IEEE Transactions on Plasma Science, Oct. 2007, 35(5), 1501-1510.

Locke et al, "Electrohydraulic Discharge and Nonthermal Plasma for Water Treatment", Ind. Eng. Chem. Res., 2006, 45(3), 882-905.

Takahashi et al, "Water Purification Using Non-Thermal Plasma Driven by Blumlein-Line Stacked Pulsed Power Generator", J. Plasma Fusion Res. Series, 2009, 8, 1459-1462.

Sugiarto, A., and Masayuki, S., "Pulsed Plasma Processing of Organic Compounds in Aqueous Solution", Thin Solid Films, May 2001, 386(2), 295-299.

* cited by examiner

FIG. 9A-C

| | Bicarbonate Concentration (ppm) | Time (h) | Images of Heating Elements |
|---|---|---|---|
| a) | FIG. 9A 500 ppm | 0 | |
| | | 30 | |
| b) | FIG. 9B 100 ppm | 0 | |
| | | 30 | |
| c) | FIG. 9C 0 ppm | 0 | |
| | | 30 | |

PRE-TREATING WATER WITH NON-THERMAL PLASMA

CROSS REFERENCE TO RELATED APPLICATIONS

This application claims the benefit of U.S. Application Ser. No. 61/723,004, filed Nov. 6, 2012, the contents of which are incorporated by reference in its entirety for all purposes.

GOVERNMENT RIGHTS

This invention was made with government support under Contract No. DE-AC26-07NT42677 awarded by the Department of Energy (RPSEA Program). The government has certain rights in the invention.

TECHNICAL FIELD

The present invention consists of a method of pre-treatment of adulterated water for distillation, including adulterated water produced during hydraulic fracturing ("fracking") of shale rock during oil and natural gas drilling.

BACKGROUND

Natural gas production through hydraulic fracturing of shale formations is a rapidly accelerating field. Shale gas is now widely viewed in the U.S. as a key asset, which can bolster a more energy-independent future. In the midst of widespread optimism towards shale gas, certain environmental concerns have arisen that center on seismic effects of hydraulic fracturing as well as the aggressive consumption of water and, more importantly, possible pollution of local water resources by produced and flowback waters.

Frac/Produced water is the largest waste stream generated in the gas industry. It is a mixture of different organic and inorganic compounds. Due to the increasing volume requirements of water, the outcome and effect of discharging frac/produced water on the environment has become an increasingly significant issue of environmental concern. Many environmental activists worry that fracking fluids and produced water could contaminate nearby groundwater.

Even though fracking chemicals make up approximately 0.5% of the overall drilling fluids, this proportion still amounts to some 25,000 gal. (95,000 L) in a well with 5 million-gallons (19 million L) of water. Even in an ideal case, hydraulic fracturing can produce over 1 million gal. (3.8 million liters) of toxic, briny wastewater over the lifetime of an individual well. In western states like Texas, companies can store the wastewater in deep underground control wells, but in eastern states like Pennsylvania, geology makes that difficult. As a result, drillers have had to ship much of their wastewater to nearby municipal treatment plants by truck. Hence, the transportation of the frac/produced water itself becomes another environmental concern with additional burden to develop improved roadways for trucks.

Frac/produced water is conventionally treated using a range of physical, chemical, and biological methods. Since there are multiple needs that should be addressed in produced water treatment, a variety of different conventional methodologies have been used, including the following: activated carbon, various forms of filtration (such as sand filters, cartridge filters, multi-media filtration, membrane filtration), organic-clay adsorbers, chemical oxidation, UV disinfection, chemical biocides, air strippers, chemical precipitation, water-softening by the application of lime soda, clarifiers, settling ponds, ion exchange, reverse osmosis, evaporation, steam stripping, and acidification. In nearly all of the above cases, each modality of technology typically addresses only a single treatment target. For example, UV disinfection can only destroy bacteria and is unable to address any of the other objectives. Other processes that are potentially applicable to produced water treatment can be applied to only a limited number of basic functions.

The present invention is directed to surmounting some of these problems.

SUMMARY

The present invention consists of a method of pre-treatment of adulterated water for distillation, including adulterated water produced during hydraulic fracturing ("fracking") of shale rock during oil and natural gas drilling. In particular, the invention is directed to a method of treating adulterated water, said adulterated water having an initial level of bicarbonate ion of at least about 250 ppm, said method comprising: (a) contacting the adulterated water with a non-thermal arc discharge plasma to produce plasma treated water having a level of bicarbonate ion of less than about 100 ppm; and (b) optionally distilling the plasma treated water.

BRIEF DESCRIPTION OF THE DRAWINGS

The present application is further understood when read in conjunction with the appended drawings. For the purpose of illustrating the subject matter, there are shown in the drawings exemplary embodiments of the subject matter; however, the presently disclosed subject matter is not limited to the specific methods, devices, and systems disclosed. In addition, the drawings are not necessarily drawn to scale. In the drawings:

FIG. 9A-C show digital photographs of the heating element used in the present study before and after fouling tests with a fixed calcium concentration of 5,000 ppm; FIG. 9A at 500 ppm bicarbonate, FIG. 9B at 100 ppm bicarbonate, and FIG. 9C at 0 ppm bicarbonate. Unheated sections of heating element are marked as "X".

DETAILED DESCRIPTION OF ILLUSTRATIVE EMBODIMENTS

Figure 1A:
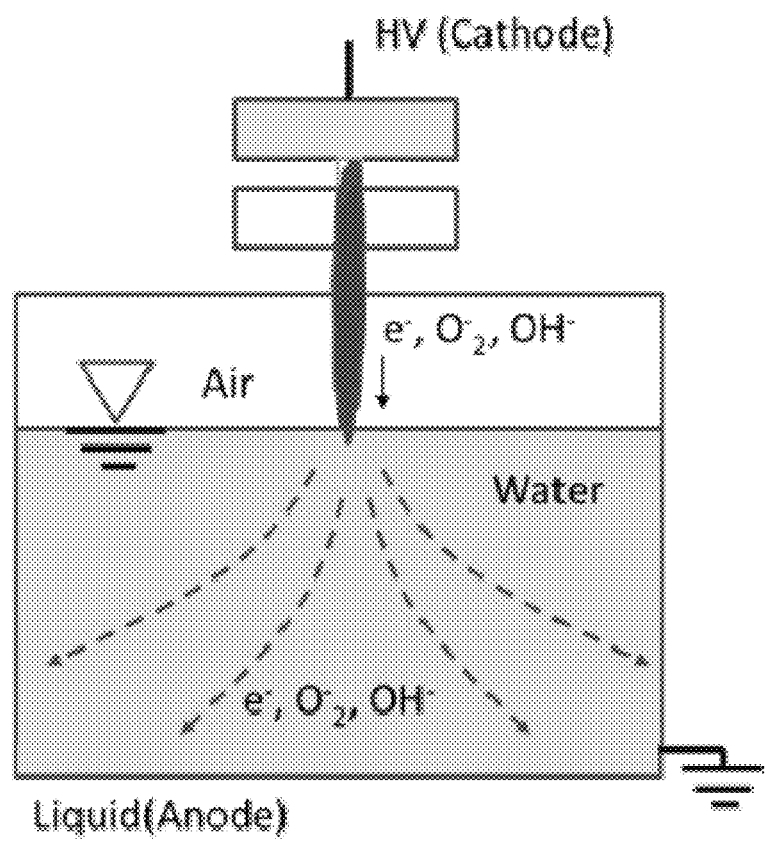
FIG. 1A is a sketch that shows how the present plasma-induced softening process works. Active plasma species precipitate excess calcium and magnesium ions from frac/produced water to suspended particles that are removed by a self-cleaning filtration system.

The present invention introduces a new water treatment method using plasma—not as a means to generate active species—but rather, as a pre-treatment means to obviate mineral fouling and improve the efficiency of a subsequent distillation. In the example provided above, where vapor compression distillation is the distillation modality used, a plasma pre-treatment module invention softens water by removing bicarbonate ions and filtration is used to remove suspended solid particles.

The present invention is able to resolve multiple issues in the treatment of large volumes of both flowback water during the drilling phase and produced water during the production phase. Distillation—when feasible—is a robust method for purifying water of multiple target adulterants. Pre-treatment of produced water and flowback water using plasma makes distillation possible, feasible and energy efficient. In this way, multiple issues are addressed simultaneously.

The present invention may be understood more readily by reference to the following description taken in connection with the accompanying Figures and Examples, all of which form a part of this disclosure. It is to be understood that this invention is not limited to the specific products, methods, conditions or parameters described or shown herein, and that the terminology used herein is for the purpose of describing particular embodiments by way of example only and is not intended to be limiting of any claimed invention. Similarly, unless specifically otherwise stated, any description as to a possible mechanism or mode of action or reason for improvement is meant to be illustrative only, and the invention herein is not to be constrained by the correctness or incorrectness of any such suggested mechanism or mode of action or reason for improvement. Throughout this text, it is recognized that the descriptions refer to compositions and methods of making and using said compositions. That is, where the disclosure describes or claims a feature or embodiment associated with a composition or a method of making or using a composition, it is appreciated that such a description or claim is intended to extend these features or embodiment to embodiments in each of these contexts (i.e., compositions, methods of making, and methods of using).

In the present disclosure the singular forms "a," "an," and "the" include the plural reference, and reference to a particular numerical value includes at least that particular value, unless the context clearly indicates otherwise. Thus, for example, a reference to "a material" is a reference to at least one of such materials and equivalents thereof known to those skilled in the art, and so forth.

When a value is expressed as an approximation by use of the descriptor "about," it will be understood that the particular value forms another embodiment. In general, use of the term "about" indicates approximations that can vary depending on the desired properties sought to be obtained by the disclosed subject matter and is to be interpreted in the specific context in which it is used, based on its function. The person skilled in the art will be able to interpret this as a matter of routine. In some cases, the number of significant figures used for a particular value may be one non-limiting method of determining the extent of the word "about." In other cases, the gradations used in a series of values may be used to determine the intended range available to the term "about" for each value. Where present, all ranges are inclusive and combinable. That is, references to values stated in ranges include every value within that range.

It is to be appreciated that certain features of the invention which are, for clarity, described herein in the context of separate embodiments, may also be provided in combination in a single embodiment. That is, unless obviously incompatible or specifically excluded, each individual embodiment is deemed to be combinable with any other embodiment(s) and such a combination is considered to be another embodiment. Conversely, various features of the invention that are, for brevity, described in the context of a single embodiment, may also be provided separately or in any sub-combination. Finally, while an embodiment may be described as part of a series of steps or part of a more general structure, each said step may also be considered an independent embodiment in itself, combinable with others.

The transitional terms "comprising," "consisting essentially of," and "consisting" are intended to connote their generally in accepted meanings in the patent vernacular; that is, (i) "comprising," which is synonymous with "including," "containing," or "characterized by," is inclusive or open-ended and does not exclude additional, unrecited elements or method steps; (ii) "consisting of" excludes any element, step, or ingredient not specified in the claim; and (iii) "consisting essentially of" limits the scope of a claim to the specified materials or steps "and those that do not materially affect the basic and novel characteristic(s)" of the claimed invention. Embodiments described in terms of the phrase "comprising" (or its equivalents), also provide, as embodiments, those which are independently described in terms of "consisting of" and "consisting essentially" of When a list is presented, unless stated otherwise, it is to be understood that each individual element of that list, and every combination of that list, is a separate embodiment. For example, a list of embodiments presented as "A, B, or C" is to be interpreted as including the embodiments, "A," "B," "C," "A or B," "A or C," "B or C," or "A, B, or C."

Throughout this specification, words are to be afforded their normal meaning, as would be understood by those skilled in the relevant art. However, so as to avoid misunderstanding, the meanings of certain terms will be specifically defined or clarified.

The present invention includes methods of pre-treating water for distillation and methods including distillation. An arc discharge generated by plasma may be applied to water, which contains inorganic or organic adulterants, and suspended particles are subsequently (optionally) removed from plasma-treated water using a filtration means. According to the aforementioned aspects of the present invention, commonly found mineral ions, including but not limited to the bicarbonate ion, are reduced. Additionally, the pH level of the water is increased. According to these aspects of the present invention, especially the removal or reduction of bicarbonate ion levels, the water is usefully produced and effectively pre-treated for the process of distillation or other further purification methods.

Produced water is water from a reservoir of gas or oil that flows to the surface with gas or oil during the life of the well. Flowback water is water that comes out during the drilling phase. The present invention utilizes arc generated plasma to pre-treat the produced water, flowback water, or both, optionally prior to distillation. According to one embodiment of the invention, this arc is generated by a gliding arc plasmatron, which uses compressed gas (including air, oxygen, or a combination thereof) to glide the arc along the circumference of two electrodes. According to a specific embodiment of the invention, the plasmatron is used in water-cathode mode (i.e., where the plasmatron is grounded and the water has a high potential voltage), wherein the arc generates electrons, oxygen ions, hydroxyl ions, UV, and other active plasma species. One of the major reactions in water is the dissociation of bicarbonate ions, thus reducing the concentration of the bicarbonate ions in water while making water acidic. When the bicarbonate ions are significantly reduced to low, very low, negligible, or near-zero levels, it is difficult or impossible for calcium ions to create typical fouling problems (i.e., mineral fouling or scaling). As such, the distillation unit which lies distal to the plasma-based pre-treatment module can be operated without fouling problems. This important effect is present despite high concentrations of calcium ions in the water.

There are a large number of treatment technologies used for the treatment of produced water, which include activated carbon, various filters, organic-clay adsorbers, chemical oxidation, UV disinfection, biocides, air stripper, chemical precipitation, lime-soda softening, clarifiers, settling ponds, ion exchangers, multi-media filtration, membrane filtration, sand filters, cartridge filters, reverse osmosis, evaporation, steam stripping, and acidification. Additionally, plasma-based water treatment is a broad field of existing technologies.

The present invention is unique insofar as plasma is used as a pre-treatment means prior to distillation. The important, robust active species created by plasma discharge, including electrons, oxygen ions, hydroxyl ions, ultraviolet radiation, among others—while helpful to oxidize organic constituents, polymers, dissolved gases, and many other—are not central to this invention. Rather, it is the novel and unique impact of bicarbonate reduction and acidification of target waters, such as produced water, that is the focus the present invention. As such, plasma treatment is strictly for pre-treatment of a distillation means wherein mineral fouling is disabled.

A key impact of the present invention is increased energy efficiency. Heat exchangers and heating elements which are free of mineral scale are more energy efficient ceteris paribus. By incorporating the most energy efficient distillation modules, such as advanced vapor compression distillation, with the present invention, energy efficiency is increased further. For example, it is estimated that energy savings on the order of 50% relative to the distillation may be realized by this plasma pre-treatment (performance losses due to mineral fouling estimated to be on the order of 70% to 90%).

Certain embodiments provide methods for pre-treating water, each method comprising treating adulterated water, said adulterated water having an initial level of bicarbonate ion of at least about 250 ppm, each method comprising: (a) contacting the adulterated water with a non-thermal arc discharge plasma to produce plasma treated water having a level of bicarbonate ion of less than about 100 ppm; and (b) optionally distilling the plasma treated water. That is, the plasma treated water may or may not be further distilled.

In certain of these embodiments, the adulterated water comprises flowback water produced during drilling or water otherwise produced during hydraulic fracturing ("fracking") of shale rock during natural gas or oil drilling.

In other embodiments, the adulterated water has an initial level of bicarbonate ion of at least about 500 ppm. In other independent embodiments, the adulterated water has an initial level of bicarbonate ions in the range having a lower boundary of about 250 ppm, about 500 ppm, about 1000 ppm, about 2500 ppm, about 5000 ppm and independently having an upper boundary of about 5,000 ppm or 10,000 ppm. In one exemplary, non-limiting example, the initial level of bicarbonate ion is in the range of from about 500 ppm to about 5,000 ppm.

In other independent embodiments, the plasma treated water has a bicarbonate ion level less than about 100 ppm, 50 ppm, about 25 ppm, about 10 ppm, about 5 ppm, or about 2 ppm. In some embodiments, the bicarbonate ion level is practically undetectable. In certain embodiments, the plasma treated water has a bicarbonate ion level in the range having a lower boundary of 1 ppm, about 2 ppm, about 3 ppm, about 4 ppm, about 5 ppm, about 10 ppm, about 15 ppm, about 20 ppm, or about 25 ppm and independently having an upper boundary of about 100 ppm, 50 ppm, about 25 ppm, about 10 ppm, about 5 ppm. In one exemplary, non-limiting example, the initial level of bicarbonate ion is in the range of from about 10 ppm to about 50 ppm.

In certain of these embodiments, the adulterated water comprises water produced during hydraulic fracturing ("fracking") of shale rock during natural gas drilling.

In other embodiments, the adulterated water has an initial level of calcium ions of at least about 1000 ppm. In other independent embodiments, the adulterated water has an initial level of calcium ions in the range having a lower boundary of about 500 ppm, about 1000 ppm, about 2500 ppm, about 5000 ppm, about 10,000, about 25,000, or about 50,000 ppm and independently having an upper boundary of about 100,000 ppm, about 50,000 ppm, about 40,000 ppm, about 30,000 ppm, about 20,000 ppm, about 15,000 ppm, about 10,000 ppm, or about 5,000 ppm. In one exemplary, non-limiting example, the initial level of calcium ions is in the range of from about 500 ppm to about 50,000 ppm.

Non-thermal plasmas useful in the present invention may be generated by a variety of means, including being generated by a gliding arc discharge or spark discharge (i.e., spark discharge in the presence of injected added air, oxygen, a combination thereof, or another gas). Distillation may be achieved by conventional thermal, vacuum, or vapor compression distillation. Some exemplary treatment options are provided as follows.

Component 1. Plasma Treatment: Plasma treatment is preferably performed using a gliding arc discharge. In some embodiments, the water itself acts as cathode. In other embodiments, the water acts as the anode. In either case, a variety of electrodes and water may be configured to provide the requisite plasma into the water. For example, in certain embodiments, a gliding arc plasma is developed in a plasmatron chamber comprising at least one hollow electrode, and at least part of the adulterated water is injected axially into the plasma through this hollow electrode. In another embodiment, a gliding arc plasma is developed in a hollow plasmatron chamber, and the adulterated water is injected radially into the plasma zone. In yet another embodiment, a gliding arc plasmatron is submerged into the water to be treated, after which a gliding arc plasma is initiated within the plasmatron, said plasma contacting the water directly. In other embodiments, at least part of the water is injected into the submerged plasmatron, specifically into the vapor bubble created by the plasma jet Implicit in the use of gliding arc plasma in these applications is the concomitant injection of air, oxygen, other gas, or a combination thereof during the formation of the gliding arc plasma, in order to maintain the gliding arc. In other plasma generating methods (for example, using spark discharge), it is also necessary to inject added air, oxygen, a combination thereof, or another gas, in order for plasma to be discharged successfully in the adulterated water.

Individual gliding arc plasma reactors used in the present invention are typically operated in a range of from about 800 V to about 10 kV, preferably in a range of from about 1000 to about 1500 V, and an average current in a range of from about 2 to about 50 A, preferably in a range of from about 5 to about 30 A, or from about 10 to about 30 A. Having said this, in any given application, individual gliding arc reactors may be operated at even higher voltages or in arrays of multiple reactors to provide power levels of about 5 to 10 kilowatts, or higher.

In certain embodiments, non-thermal plasmas may be generated using spark discharge techniques, in which the spark discharge being generated by a plurality of high voltage pulses (a) at a rate in a range of from about 1 to about 2000 pulses per second, with exemplary frequencies in a range of from about 1 to about 10 Hz, from about 10 to about 100 Hz, from about 100 to about 1000 Hz, from about 1 kHz to about 2 kHz, or a combination thereof, depending on application; (b) each pulse having a duration in a range of from about 10 nanosecond to about 10 microseconds, preferably 50-100 nanoseconds; (c) each pulse having an intensity in a range of about 10 J to about 500 J per pulse, preferably about 20 J/pulse; or (d) a combination thereof.

In part because of the plasma energies, and in part because of the presence or injection of air, oxygen, or both during or concomitant with the generation of the plasma, it appears that much higher levels of hydrogen ions are produced in the instant methods, than in other plasma-water treatment methods. This provides for a mechanism that is fundamentally different than previous applications of non-thermal plasma to water, whose purpose and effect was to precipitate calcium carbonate. Since the present methods appear to reduce the bicarbonate levels by virtue of the production of much higher levels of acid by the plasma, they do not necessarily result in the precipitation of calcium carbonate, even in the presence of calcium ions. Even in the presence of particulate calcium carbonate, the higher acid levels dissolve the particulates to form calcium ions with the associated formation and decomposition of carbonic acid to form water and $CO_2$.

In any case, this gliding arc has been shown by this present invention to reduce the concentration of bicarbonate ions in the flowback or produced water. As a result of bicarbonate reduction, calcium ions present in produced water are unable to bind to their normal mineral fouling substrate in the presence of higher energies from applied heat or pressure. Therefore, the application of heat or pressure distills the water without mineral fouling/scaling.

Note, active plasma species such as $e^-$, $O^-_2$, and $OH^-$, and UV generated from the gliding arc and spark discharge also destroy bacteria in a highly robust manner and effectively oxidize organic constituents such as hydrocarbons, high molecular weight organic acids (added as drag-reducing polymers), surfactants, biocides, dissolved gases, anti-scaling agents, corrosion inhibitors, and hydrate inhibitors. These are added strengths of the present modality.

The present invention of plasma pre-treatment of produced water includes a plasma-induced "softening" process. In one embodiment, water is softened by a gliding arc generated between two electrodes with the top electrode used as cathode and the bottom as anode. Due to the tangential flow of compressed air in the space between the two electrodes, arc moves circumferentially and exits through a hole at the bottom circular disk electrode, which forms an arc jet. This is called a plasmatron and is known in the art. The present invention is a method for using plasma generators such as a plasmatron specifically for the pre-treatment of produced water, bicarbonate reduction, and increased energy efficiency of distillation.

Figure 1B:
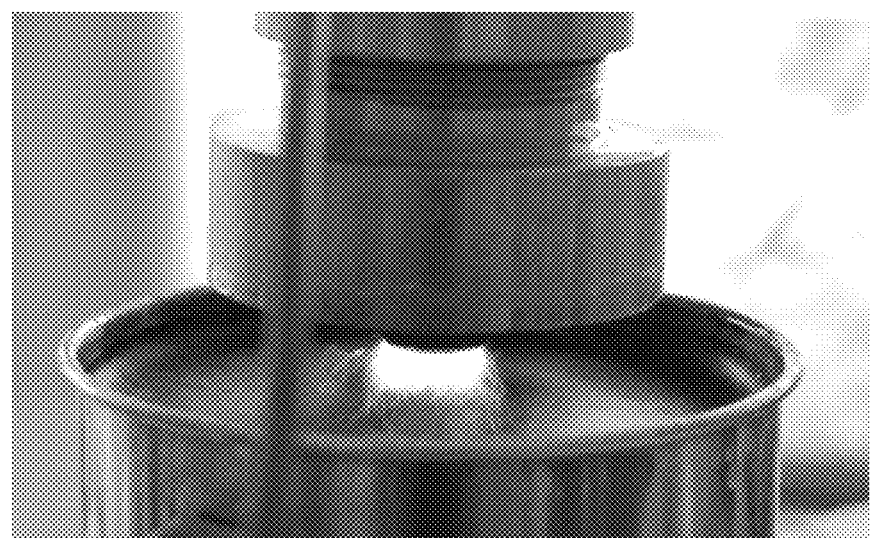
FIG. 1B is a photograph showing arc discharge that makes contact with water in a water-anode mode in a metal container FIG. 2A and FIG. 2B provide descriptions of an exemplary gliding arc plasma system for water treatment.

At the plasmatron, when water is connected to the ground electrode with another electrode as a negative high voltage, it is referred as water-anode mode. Conversely, when water is connected to a negative high-voltage electrode, it is referred as water-cathode mode. The present invention can utilize either water-anode or water-cathode mode although the water-cathode mode is a more efficient, preferred mode. FIG. 1A and FIG. 1B show a schematic and photographic example using water-anode mode. When the arc jet makes physical contact with water as shown in FIG. 1, it creates a region of a very intense local heating. In addition, since the metal reservoir, thus water, is used as anode, electrolysis takes place in water.

Figure 2A:
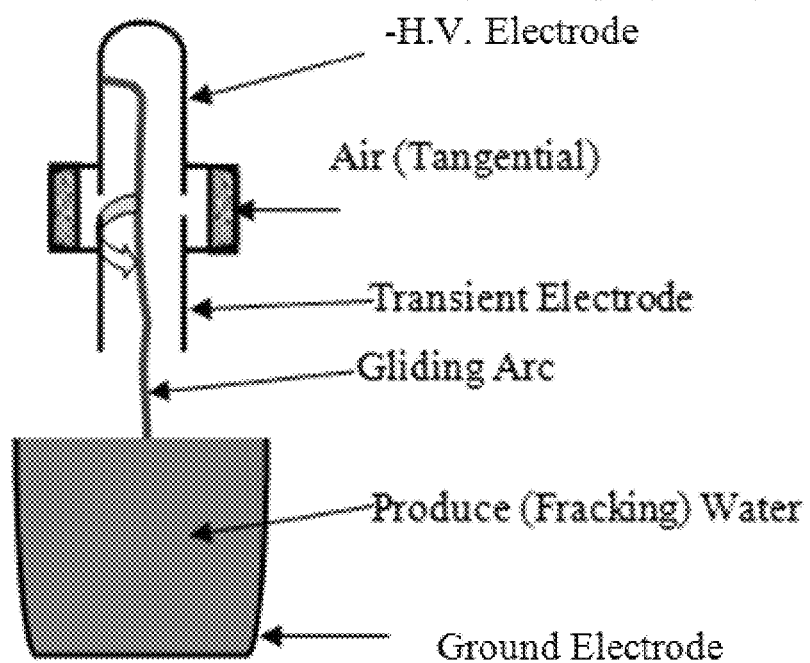
Figure 2B:
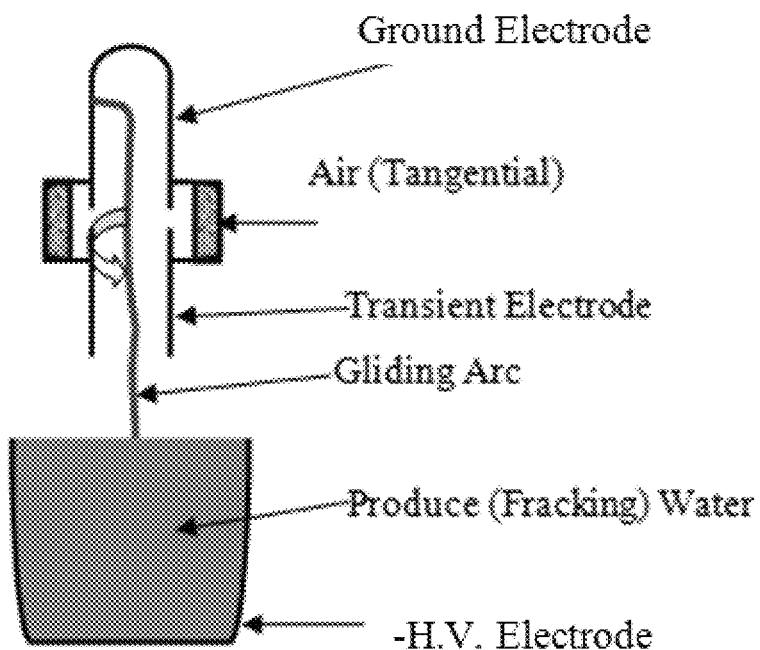

Additional schematics of exemplary gliding arc plasma systems are shown on FIG. 2A and FIG. 2B, where plasma gas (air) is injected tangentially in a gap between the high voltage and transient electrodes (FIG. 2A and FIG. 2B differ in the polarity of the two electrodes). Discharge starts between these two electrodes and then extends to the water surface, thus providing intensive local heating and treatment of fracking water.

Figure 3:
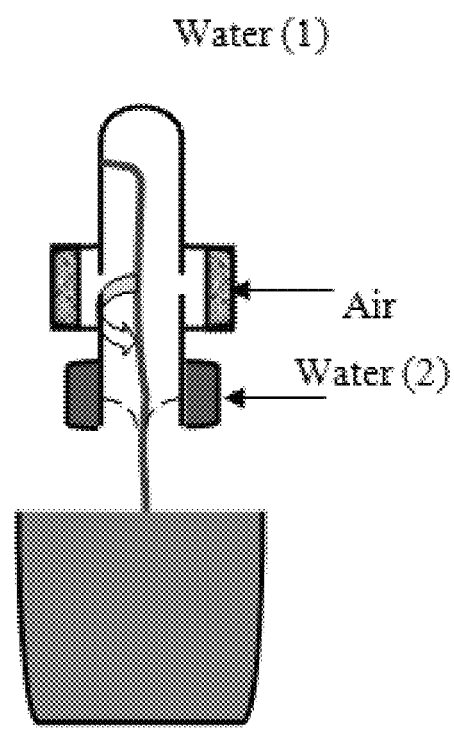
FIG. 3 illustrates the different potential injection points of water into an exemplary gliding arc system.

To improve contact between produced water and the plasma discharge part of the water can also be injected into plasma zone (FIG. 3). Points of injection can be: a single axial injection through the top (high voltage) electrode above gliding arc (point 1) or/and several radial injections through the transient electrode into plasma jet (points 2).

Figure 4:
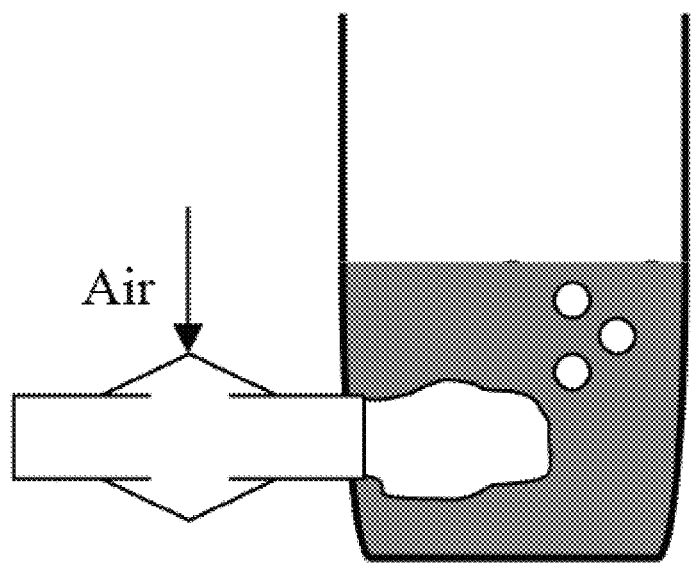
FIG. 4 illustrates an exemplary plasma system with gliding arc plasmatron submerged into fracking water.

Another alternative exemplary version of plasma jet produced in gliding arc plasmatron with fracking water is shown at FIG. 4. In this design the gliding arc plasmatron is submerged into fracking water, so the plasma jet operates in a gas bubble and provides better interaction between gliding arc, active species from plasma gas and water to be treated.

Figure 5:
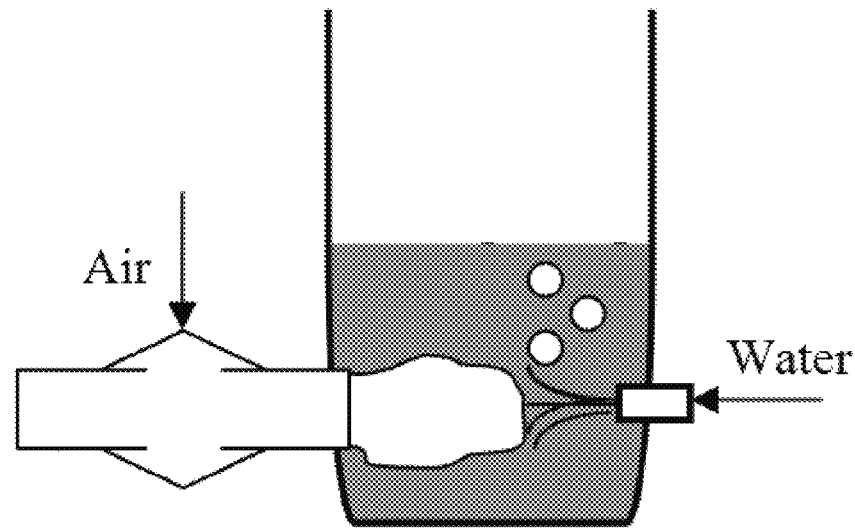
FIG. 5 illustrates an exemplary plasma system with a plasmatron submerged into fracking water and part of the water injected into the plasma jet.
Figure 6:
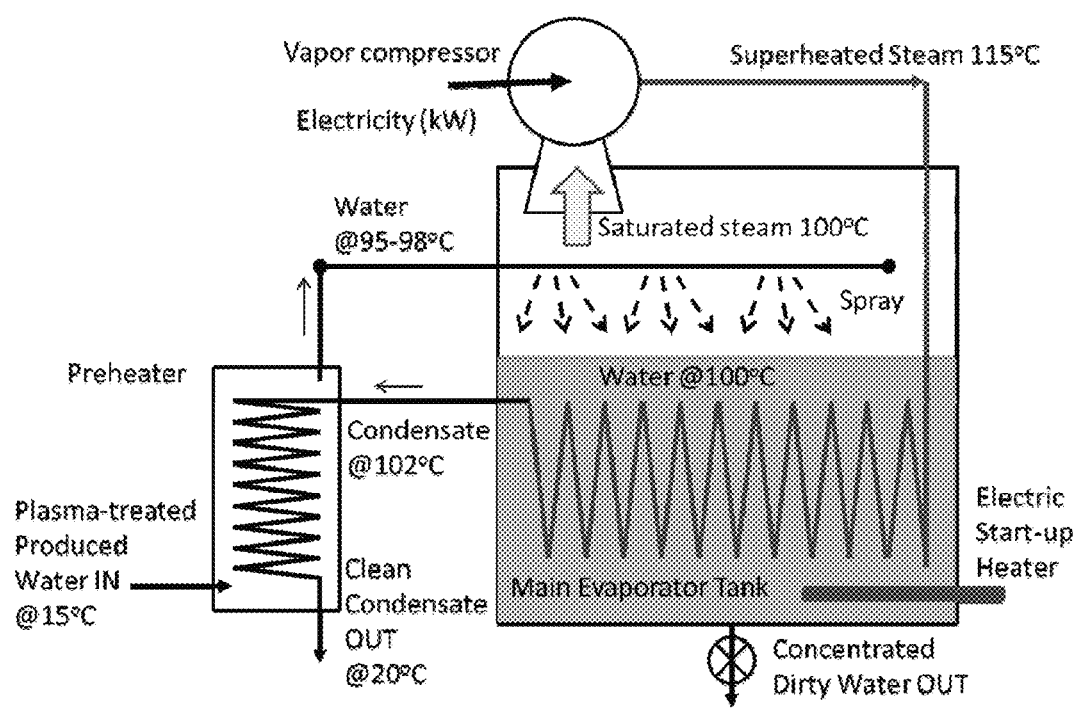
FIG. 6 provides a schematic diagram of a vapor-compression distillation (VCD) process.

Yet another modification of gliding arc plasma system is shown in FIG. 5. Here in order to provide close contact between plasma jet and water to be treated, part of the water is injected through the pneumatic nozzle into vicinity of submerged plasma jet.

Component (2). Advanced Filtration: The method methods described herein may further comprise removing solids from the plasma treated water, for example by centrifugation or filtration. Any effective filtration system could be used here as a component of the present method for produced water treatment. We provide a specific example of an advanced plasma-enhanced filtration system comprised of a self-cleaning filter using a spark discharge sending shock waves to continuously remove particulates from filter orifices. Both TDS (total dissolved solids) and TSS (total suspended solids) levels are significantly reduced after filtration.

Component (3). Vapor-Compression Distillation (VCD): Using VCD, produced water is converted to distilled water. This process is orders of magnitude more energy efficient than conventional thermal distillation, although conventional thermal distillation might also be used as an alternative here. In addition, the VCD process removes any residual dissolved gases, hydrocarbons, and other constituents. According to the current state-of-the-art, VCD is limited by mineral fouling, resulting in catastrophic failure of the distillation system. In the present invention, however, the plasma treatment removes bicarbonate ions in produced water, leaving remaining calcium ions unable to bind to their normal mineral fouling substrate. Therefore, even when the adulterated water contains extremely high calcium ion concentrations and extremely high concentrations of other inorganic and organic constituents as can be found in produced water, the distillation process can be performed without the fouling problem.

Certain embodiments of the present invention use VCD systems. For this example of produced water treatment, the VCD system has the specific goal of removing sodium and chloride ions as well as other adulterants from frac/produced water. Distilled water is pure water. Plasma pre-treated water has been demonstrated by the inventors to have significantly reduced concentrations of bicarbonate ions as well as reduced TDS/TSS. Thus, mineral fouling does not materially occur in the VCD unit.

In addition, the VCD used in certain embodiments recovers most of the thermal energy so that the VCD process can be run at a cost of energy far lower than any thermal distillation system. Note that since a vapor compressor is used to generate a superheated water vapor instead of boiling water, there is no additional energy cost other than the compressor work. The thermal energy in the superheated vapor will be almost completely recovered in condenser where the incoming cold water is heated to 98° C. prior to entering to distillation chamber. In order to start the VCD unit, a start-up electric heater is used, which will be turned off once the water temperature inside the VCD unit reaches about 98° C., reaching the steady-state thermal conditions.

These embodiments have a profound advantage over other conventional VCD process, which must be operated with extremely soft water with calcium ion concentration of 10 ppm or less.

The invention also contemplates those apparatuses useful or necessary for carrying out these methods, such as the equipment described herein.

The following listing of embodiments is intended to complement, rather than displace or supersede, the previous descriptions.

Embodiment 1. A method of treating adulterated water, said adulterated water having an initial level of bicarbonate ion of at least about 250 ppm, said method comprising: (a) contacting the adulterated water, under optionally aerobic conditions, with a non-thermal arc discharge plasma to produce plasma treated water having a level of bicarbonate ion of less than about 100 ppm; and (b) optionally distilling the plasma treated water.

Embodiment 2. The method of Embodiment 1, the adulterated water being flowback water or water produced during hydraulic fracturing of shale rock during oil or natural gas drilling.

Embodiment 3. The method of Embodiment 1 or 2, the adulterated water having an initial level of bicarbonate ion in the range of from about 200 ppm to about 5,000 ppm.

Embodiment 4. The method of any one of Embodiments 1 to 3, the adulterated water having an initial level of bicarbonate ion of at least about 1000 ppm.

Embodiment 5. The method of any one of Embodiments 1 to 4, the plasma treated water having a bicarbonate ion level less than about 50 ppm.

Embodiment 6. The method of any one of Embodiments 1 to 5, the plasma treated water having a bicarbonate ion level in the range of from about 10 ppm to about 50 ppm.

Embodiment 7. The method of any one of Embodiments 1 to 6, the non-thermal arc discharge plasma being generated by a gliding arc discharge.

Embodiment 8. The method of any one of Embodiments 1 to 7, further comprising removing solids from the plasma treated water.

Embodiment 9. The method of Embodiment 8, the removing of solids from the plasma treated water being accomplished by filtering.

Embodiment 10. The method of any one of Embodiments 1 to 8, where part of treated water injected axially through the capped hollow electrode into gliding arc.

Embodiment 11. The method of any one of Embodiments 1 to 8, where part of treated water injected radially into plasma zone.

Embodiment 12. The method of any one of Embodiments 1 to 8, where gliding arc plasmatron submerged into water to be treated.

Embodiment 13. The method of any one of Embodiments 1 to 8, where gliding arc plasmatron submerged into water to be treated and part of water injected into the bubble created by plasma jet.

EXAMPLES

Figure 7:
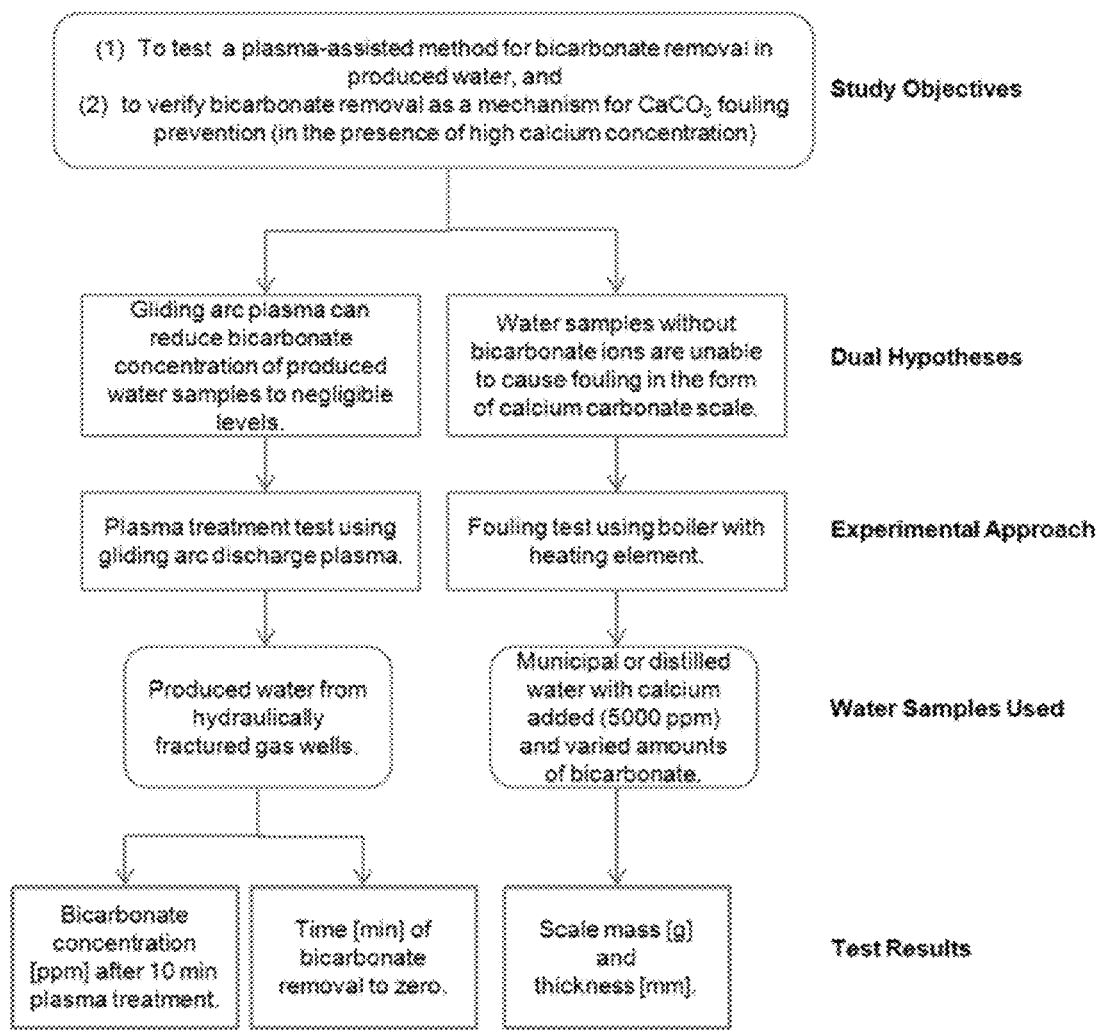
FIG. 7 is a schematic flow diagram of the study design and methods used in the Examples.

Overview: Several studies were undertaken to demonstrate new methods for preventing scaling in produced water. The study was conducted in two parts, each with their own objectives, as shown in FIG. 7: (1) to test a plasma-assisted method for bicarbonate removal in produced water, and (2) to verify bicarbonate removal as a mechanism for scale prevention. For the first objective, a plasma gliding arc discharge (GAD) was applied to produced water samples from hydraulic fracturing to demonstrate the softening of water and removal of bicarbonate content. To meet the second objective, high concentrations of calcium ions and bicarbonate ions ranging from zero to 500 ppm were artificially added to distilled water or municipal water. By applying heat over 30 h to evaporate water, the effect of bicarbonate removal was verified as a mechanism for $CaCO_3$ fouling prevention. This pilot study was designed to demonstrate a new method using plasma GAD for pretreatment of complex waste waters for the purpose of decreasing bicarbonate concentration and mineral fouling mitigation even in the presence of high calcium ion concentrations.

Water hardness consists of permanent (i.e., calcium) hardness and temporary (bicarbonate) hardness. The plasma used in this study is ionized gas having concentrated energy with highly localized temperature increases near the arc of the GAD. The geometry of the GAD system and its ability to distribute plasma in water makes it well suited to alter water chemistry, including the bicarbonate ion concentration, in water. Although the present study focuses on the ability of the GAD to prevent mineral fouling in produced water, the GAD can also oxidize hydrocarbons and inactivate microorganisms in produced water, which are topics that will be studied and reported in the future. It is known that GAD produces $H^+$ ions in water, thereby reducing the pH of water.

The H+ ions react with bicarbonate ions in produced water, converting them to $H_2O$ and $CO_2$ (gas). Detailed geometry and specifications of the GAD used in the treatment of produced water have been reported in FIG. 3, and associated text, in H. S. Kim, et al., "Concentration of hydrogen peroxide generated by gliding arc discharge and inactivation of *E. coli* in water," *International Communications in Heat and Mass Transfer* 42 (2013) 5-10. This reference is incorporated by reference herein in its entirety for all purposes, but especially for its teaching of the geometry and specifications of the gliding arc discharge reactor.

In many industries, the removal of temporary hardness by the addition of lime (i.e., CaO or $Ca(OH)_2$) is a common practice, and lime-softening of water is a highly effective chemical means for preventing fouling. The drawback of adding lime is that it increases the solid content of $CaCO_3$ sludge, in effect increasing the overall cost of disposal to landfills or landfarms, which is an important economic and environmental driver in the treatment of produced water. Since the removal of temporary hardness using plasma discharges has not been previously reported in scientific literature or in industry publications, it is necessary to demonstrate the efficacy of calcium carbonate scaling prevention in plasma-treated produced water.

Experimental Methods

A plasma gliding arc discharge configured for reverse tornado flow was utilized to generate air plasma, which was applied to produced water for treatment. The plasma GAD reactor consisted of a 1-L reservoir and a GAD plasma generator connected to a power supply and a compressed air line. Feed water entered the reactor using a peristaltic pump. For safety, a snorkel ventilation unit was employed directly above the setup for safe extraction of air and vapor from the system to outside of the laboratory. For the first part of this study, produced water samples from hydraulic fracturing for shale gas were used (Springville, Pa.).

At the beginning of each test, 700 mL of produced water was isolated into a 1-L beaker. At baseline, 50 mL of this sample was extracted with a syringe, and laboratory assessments including alkalinity and pH measurements were performed. The remaining 650 mL volume was loaded into the cylindrical plasma reactor, and plasma power was turned on. The power supply parameters for generation of plasma were recorded, including voltage and current. After 10 min, plasma power was turned off, and 50-mL of treated water was sampled for laboratory assessments including bicarbonate ion concentration. These tests were repeated a total of six times, and the results are reported in Table 1.

TABLE 1

Plasma-induced bicarbonate removal in various produced water samples

| Test No. | Volume (mL) | Plasma Treatment Time 0 (min) Bicarbonate Concentration (ppm) | Plasma Treatment Time 10 (min) Bicarbonate Concentration (ppm) | Time to zero bicarbonate (min) | Voltage (kV) | Current (A) |
|---|---|---|---|---|---|---|
| 1 | 650 | 699 | 467 | — | 2.1 | 0.1 |
| 2 | 650 | 685 | 475 | — | 2.1 | 0.1 |
| 3 | 650 | 778 | 560 | — | 2.1 | 0.1 |
| 4 | 650 | 745 | 370 | — | 2 | 0.1 |
| 5 | 650 | 685 | 458 | — | 2 | 0.1 |
| 6 | 650 | 685 | 203 | — | 1 | 0.2 |
| 7 | 650 | 760 | 364 | 50 | 2.1 | 0.1 |
| 8 | 650 | 747 | 347 | 30 | 2 | 0.1 |
| 9 | 650 | 684 | 317 | 30 | 2 | 0.1 |
| 10 | 650 | 752 | 472 | 30 | 2 | 0.1 |
| 11 | 650 | 685 | 292 | 30 | 2 | 0.1 |
| 12 | 650 | 685 | 83 | 20 | 2 | 0.1 |

For six additional tests, plasma treatment was continued beyond 10 min until the bicarbonate concentration was reduced to zero. Water samples of 50-mL volume were extracted every 10 min for one hour. Laboratory assessments were performed on all extracted water samples to assess the time required to achieve bicarbonate removal (i.e., time to zero bicarbonate) as reported in Table 1. During testing water was re-circulated at a flow rate of 50-200 mL/min using the peristaltic pump. Bicarbonate concentration was determined based on the assumption that alkalinity was due almost entirely to hydroxides, carbonates, or bicarbonates and furthermore that over the measured pH range, alkalinity was specifically due completely to bicarbonate.

While the first part of this study utilized produced water samples from a Marcellus shale gas well as previously described, the second part of the study employed municipal or distilled water with bicarbonate and calcium artificially added to tap or distilled water. This was done to verify that bicarbonate removal might be able to serve as a mechanism for scale prevention. The use of produced water for the fouling component of this study, on the other hand, would have been expected to result in oversaturation of NaCl, which could interfere with quantification of scale formation.

Figure 8:
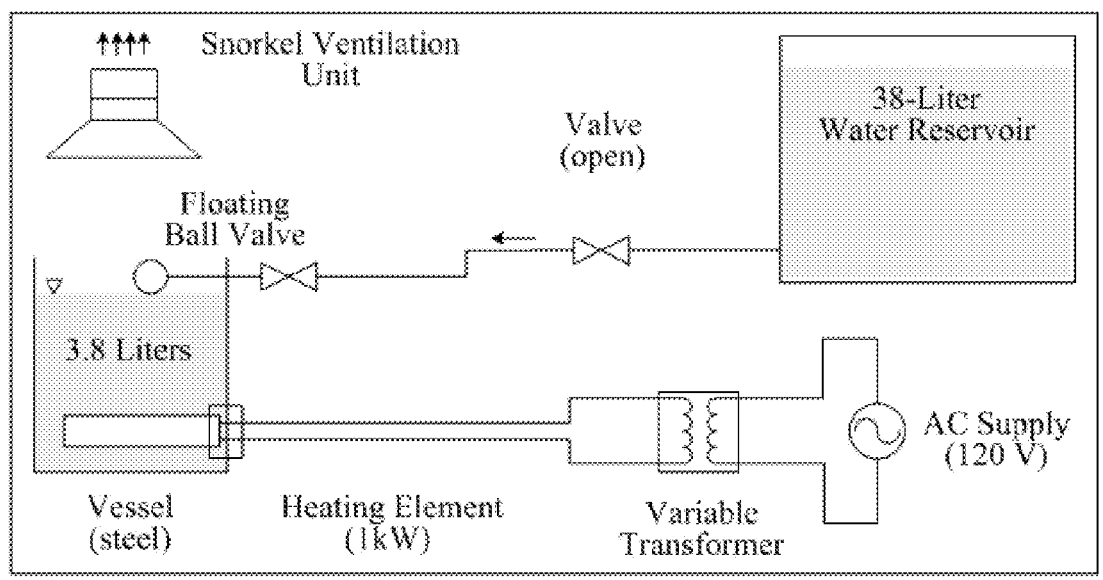
FIG. 8 is a schematic diagram of experimental setup for testing the scaling ability of water.

A schematic diagram of the fouling test facility is given in FIG. 8, which consisted of a 1-kW heating element to vaporize water, inside of a 3.8-L capacity boiler vessel made of stainless steel. Makeup water was supplied from a 38-L water reservoir tank to the boiler vessel to replace the vaporized water so that the water level in the vessel could be maintained constant during the fouling test. Water vapor was disposed of using a laboratory snorkel ventilation unit. A floating ball valve was utilized to control water flow from the reservoir tank to the vessel. A cutoff valve between the reservoir tank and the ball valve was used such that water could be fed by gravity through the floating ball valve during the test and closed at the end of the test for cleaning. The floating ball valve controlled the flow of makeup water and maintained a constant water level in the boiler vessel during the fouling test.

A cylindrical cartridge-type heating element was used having dimensions as follows: outside diameter=15.65 mm and length=154 mm. The cylindrical cartridge-heating element was installed in the boiler vessel through a port in the sidewall of the vessel. It should be noted that the heating element had unheated sections at both ends (approximately 10 mm at the free end and 25 mm at the fixed end; see sections marked X in FIG. 9). The heating element was connected to a variable transformer (120 V AC) for switching on or off The temperature of the water in the vessel was maintained using the variable transformer to allow the 1-kW element to heat at its full capacity.

Upon the completion of each fouling test, the variable transformer was used to turn the power to the heating element off. Then, the cut-off valve between the tank and floating ball valve was closed to prevent any additional water from flowing from the reservoir to the vessel. The tubing between the floating ball valve and the reservoir tank was also disconnected for cleaning prior to the next test.

Prior to fouling tests, the following measurements were taken of the heating element: weight and diameter at eight points along the axial direction each spaced 22 mm apart from 0 to 154 mm, which were used as the baseline data. Upon the completion of the fouling test (at t=30 h), the power to the heating element was turned off, and water in the vessel was pumped out using a peristaltic pump at a low flow rate, in order to minimize the physical disturbances upon any scale that had formed on the heating element. The heating element was allowed to cool to room temperature for 30 min before the element was removed. Then, the heating element was placed on a white sheet of paper on the laboratory bench and allowed to dry for one hour before a photograph was taken.

Subsequently, the change in weight from t=0 to 30 h was determined in order to quantify the magnitude of scale that had accumulated on the heating element. The amount of the accumulated scale was measured using a laboratory balance (Model VB-302A, Virtual Measurements & Control, Santa Rosa, Calif.). The thickness of the scale layer in the heating element was then determined by measuring the diameter of the heating element before and after the fouling test at 8 equidistant points along the axial direction using a digital caliper (Cen-Tech model, Harbor Freight Tools, Calabasas, Calif.).

After the completion of fouling tests and assessments of the heating element, small pieces of the scale approximately 1 cm×1 cm in size were removed from the element using a razor blade and submerged in 200 mL of distilled water to ascertain whether or not the scale from the heating element would dissolve in water over the duration of 24 h; upon seeing that the scale had not been dissolved in the distilled water for any of the three test cases, it was concluded that the scale was an insoluble compound such as $CaCO_3$ and not a soluble salt such as sodium chloride (NaCl). This is also strongly supported by the fact that the test fluid only contained two major chemicals, $CaCl_2$ and $NaHCO_3$, with a limited amount of $Na^+$ (see Table 2A).

($NaHCO_3$) as shown in Table 2A. Water samples for fouling tests (a) and (b) used municipal water (Camden, N.J.), whereas that for fouling test (c) was prepared using distilled water.

To prepare the fouling test water samples, a large reservoir tank was filled with 38 L of water. Anhydrous $CaCl_2$ powder (96%, extra pure, Acros Organics) was added to the reservoir with gentle stirring (done by hand using a stainless steel rod), and the $CaCl_2$ in water solution was left to dissolve for 10 min following artificial water-hardening procedures previously utilized by our research group. For fouling test (a), anhydrous $NaHCO_3$ powder (USP/FCC, Fisher Chemical) was slowly added (over the course of 10 min) into the reservoir, while gently stirring with a long metal rod. This solution was then left to sit for 5 min.

Prior to initiating fouling test runs, water from the makeup reservoir filled the steel vessel to a pre-determined line on its sidewall marking 3.8 L volume, at which point the floating ball valve automatically restricted water flow from the reservoir to the vessel. The water level in the makeup reservoir tank was recorded at the beginning of the test and recorded repeatedly at 6-h intervals over the test duration of 30 h. At the end of each fouling test, the volume of the water sample remaining in the reservoir was measured by emptying the remaining water into a graduated cylinder.

Water for chemistry analysis was sampled at t=0 h using a 50-mL syringe to extract a total 200-mL sample from the steel boiler vessel at each sampling time point. The first sample was used for initial laboratory assessments of water chemistry at baseline (i.e., t=0 h) for alkalinity, calcium hardness, total dissolved solids, salinity, conductivity, and pH. At t=6, 12, 24, and 30 h, the water level in the makeup reservoir was recorded, and then a 200-mL water sample was again extracted from the vessel in a similar manner. Samples were taken from the middle of the vessel volume while the heating element was turned on. Actual laboratory assessments of the water samples were performed after water samples reached room temperature and always within 20 h of the completion of each fouling test.

TABLE 2A

Initial conditions for each test including amount of chemicals added to achieve desired compositions of samples, and measured properties of water after preparing samples
Initial Conditions

| | Chemicals Added | | | Measured Properties | | | | | |
|---|---|---|---|---|---|---|---|---|---|
| Test | $CaCl_2$ (g) | $NaHCO_3$ (g) | Water (L) | $Ca^{2+}$ (ppm) | $HCO_3^-$ (ppm) | TDS (ppm) | pH | Conductivity (mS/cm) | Salinity (ppm) |
| (a) | 530 | 53 | 38 [Tap Water] | 4800 | 445 | 18,600 | 6.73 | 23 | 15,000 |
| (b) | 530 | 0 | 38 [Tap Water] | 5200 | 118 | 15,800 | 7.22 | 22.8 | 15,000 |
| (c) | 530 | 0 | 38 [Distilled Water] | 5200 | 7 | 12,000 | 6.55 | 21.9 | 15,000 |

TABLE 2B

Changes of alkalinity and bicarbonate ions in produced water after plasma treatment using a gliding arc in water cathode-mode.

| | Plasma treatment time [min] | | | |
|---|---|---|---|---|
| | 0 | 10 | 20 | 30 |
| Alkalinity (ppm as $CaCO_3$) | 561 | 239 | 68 | 0 |
| $HCO_3^-$ (ppm) | 685 | 292 | 83 | 0 |

The desired composition of fouling test water used in the present study was achieved by mixing an appropriate proportion of calcium chloride ($CaCl_2$) and sodium bicarbonate Water chemistry analyses of samples were conducted using a number of different measurement equipment and techniques. Water hardness was measured using a HI 3842 Hardness Range (400-3000 mg/L) chemical test kit from Hanna Instruments (Woonsocket, R1). Alkalinity was measured using a Carbonate Hardness/Alkalinity Test Kit from Salifert (Duiven, Netherlands). The pH and electric conductivity were measured using a MP521 Type pH/Electric Conductivity meter provided by SANXIN (Shanghai, China). Total Dissolved Solids (TDS) was measured by using a procedure similar to EPA 160.1 Total Dissolved Solids Test Method [13]. For the evaporation component of the TDS measurement procedures, the weight of a porcelain evaporating dish was measured before and after filling the dish with a 100-mL test water sample which was then heated using a laboratory hot plate (model Cimarec 3, Thermolyne, Dubuque, Iowa), to evaporate the liquid until solid particles were left inside the dish. The weight change of the evaporating dish provided a measure of the amount of solids, and this quantity was divided by the volume of water evaporated to give a value of TDS. Mass measurements were performed using a precision laboratory balance (Sartorius GP603S, Data Weighing Systems, Elk Grove, Ill.).

Results

For the plasma component of this study the GAD was applied directly to produced water, and observed was a decrease in the concentration of bicarbonate ions in produced water as shown in Table 1. The baseline concentration of bicarbonate ions in produced water samples used in the present study was in the range of 680-780 ppm. The post-treatment bicarbonate concentration ranged from 0 to approximately 500 ppm during the present fouling tests. All 12 of the plasma GAD tests reported in Table 1 showed a decrease in bicarbonate concentration for the produced water samples following GAD treatment. This phenomenon was observed by measuring the bicarbonate concentration at time, t=0 min and t=10 min. For six of these tests (tests 7-12), after sampling at 10 min, plasma power was left on and allowed to continue running to investigate whether or not complete removal of bicarbonate content was possible. Water samples were taken for laboratory assessments every 10 min for a total of one hour of treatment. Plasma test 7 showed complete removal from 760 ppm to zero bicarbonate within 50 min; plasma tests 8 to 11 showed complete removal from 747 ppm, 684 ppm, 752 ppm, and 685 ppm respectively within 30 min; and, plasma test 12 showed complete bicarbonate removal from 685 ppm within 20 min. It can be observed from Table 1 that the treatment time required before complete bicarbonate removal was seen, decreased by more than half from 50 minutes to 20 minutes from test 7 to test 12. Reasons for this dramatic difference in the plasma treatment time required to completely remove bicarbonate content were not clear. Because of the use of compressed air to drive the gliding arc, the GAD is a highly dynamic system. Additional research is necessary to study the reason for these large differences in treatment time for achieving complete bicarbonate removal. It is noteworthy that the plasma GAD was able to decisively reduce bicarbonate in water and despite extremely high calcium ion concentrations in these produced water samples, when this water interacts with the heated surfaces of heat transfer equipment, mineral fouling such as that of $CaCO_3$ should not occur. The secondary part of this study utilized fouling tests to clearly show the benefits of supplying bicarbonate-depleted process water into a heat transfer system.

Table 2A shows the initial conditions for the three fouling test cases. The average baseline calcium ion concentration for all three tests in the present study was 5,000 ppm, ranging from 4,800 to 5,200, whereas the bicarbonate concentrations varied from 7 to 445 ppm. For the water prepared for fouling test (b), $NaHCO_3$ powder was not added to municipal water, but the concentration of bicarbonate ions was 118 ppm, reflecting the bicarbonate ions in the municipal water. Although distilled water was used for fouling test (c), a small amount of bicarbonate ions (i.e., 7 ppm) was already present in the distilled water. The pH values of the three water samples varied slightly. Both electric conductivity and salinity were relatively high in all three water samples due to the addition of $CaCl_2$.

FIG. 9 shows photographs of the heating element before and after the fouling test obtained for all three test cases. The eight points along the axial direction of the heating element, at which diameters were measured to quantify scale thickness, are shown in the photographs.

Figure 10:
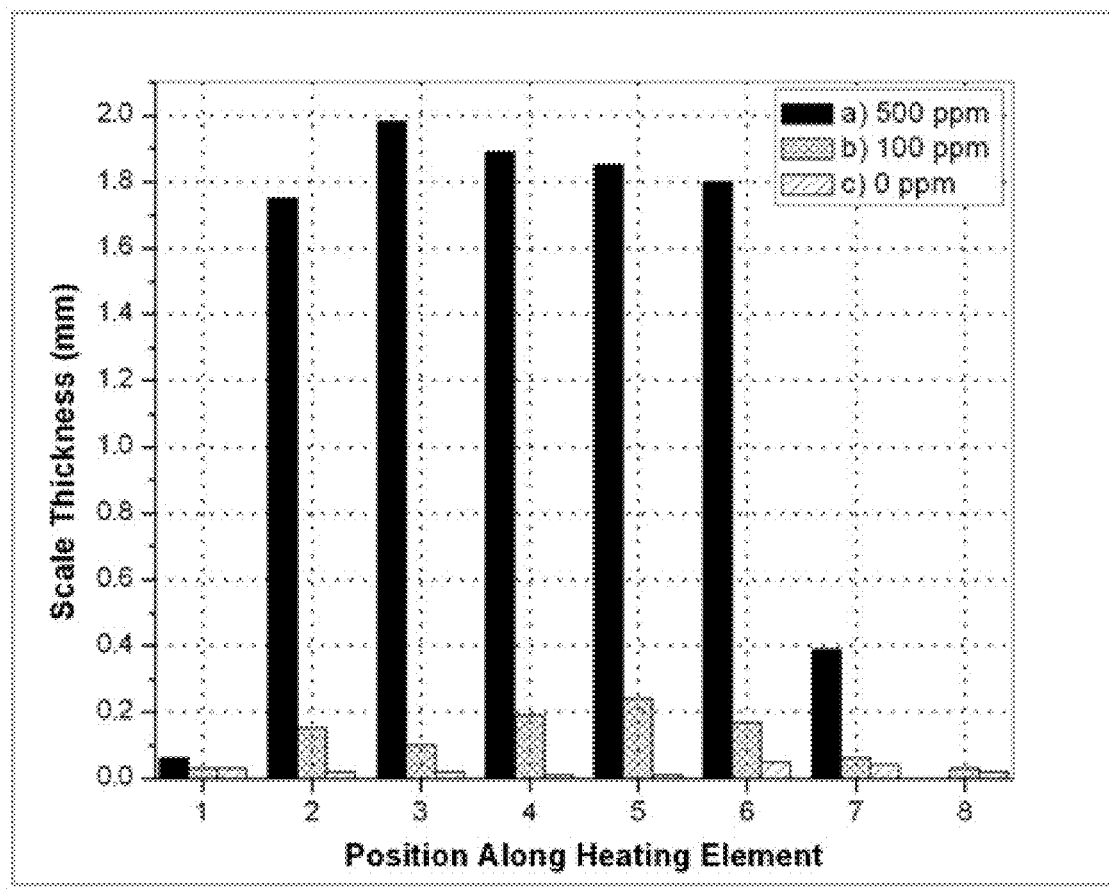
FIG. 10 provides a comparison of scale thickness at 8 points (each 22 mm apart) along a 154-mm long heating element for each of the three test cases.

FIG. 10 shows variations in scale thicknesses in the three fouling test cases, measured at eight axial points. In the case of fouling test (a), the scale thickness was approximately 1.85±0.09 mm between position #2 and #6, whereas in the case of fouling test (b), the scale thickness was approximately 0.17±0.05 mm between position #2 and #6. In the case of fouling test (c), the scale thickness approached zero. Table 3 provides the masses of accumulated scale and the average scale thicknesses over the entire heating element for the three test cases. As expected, fouling test (a) had the largest scale accumulated, whereas fouling test (c) approached zero accumulation of scale.

TABLE 3

Results of the amount and average thickness of scale accumulated on heating element in three tests.

| Test | Bicarbonate Concentration (ppm) | Accumulated Scale (g) | Average Thickness of Scale (mm) |
| --- | --- | --- | --- |
| (a) | 500 | 9.97 | 1.85 |
| (b) | 100 | 0.97 | 0.17 |
| (c) | 0 | −0.01 | 0.02 |

FIGS. 11A to 11D show variations in the total water volume, salinity, electric conductivity, and TDS over time for the three fouling test cases. The total water volume linearly decreased with time from the initial value of 38 L to approximately 12 L due to evaporation as the heating element provided a constant thermal energy during the fouling test. On the other hand, the salinity, electric conductivity, and TDS increased almost linearly with time as expected. Note that the conductivity and TDS in all three test cases reached 110 mS/cm and 95,000 ppm, respectively, at the end of the fouling tests, which are values that are often seen in produced water.

Figure 12A:
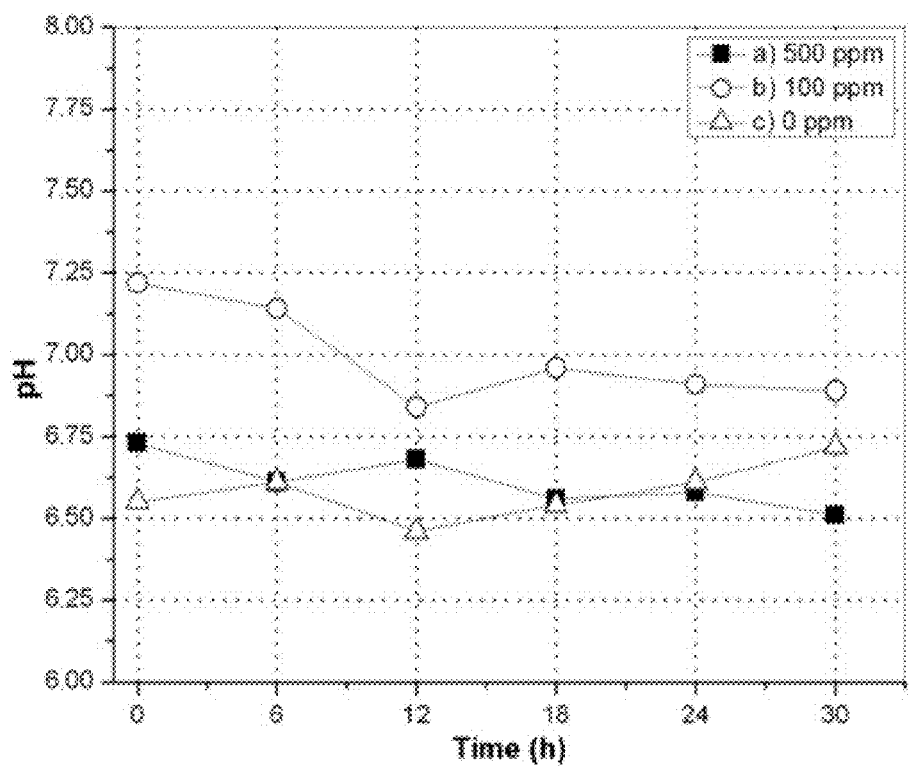
FIG. 12A shows the pH over time for Tests (a), (b), and (c).
Figure 12B:
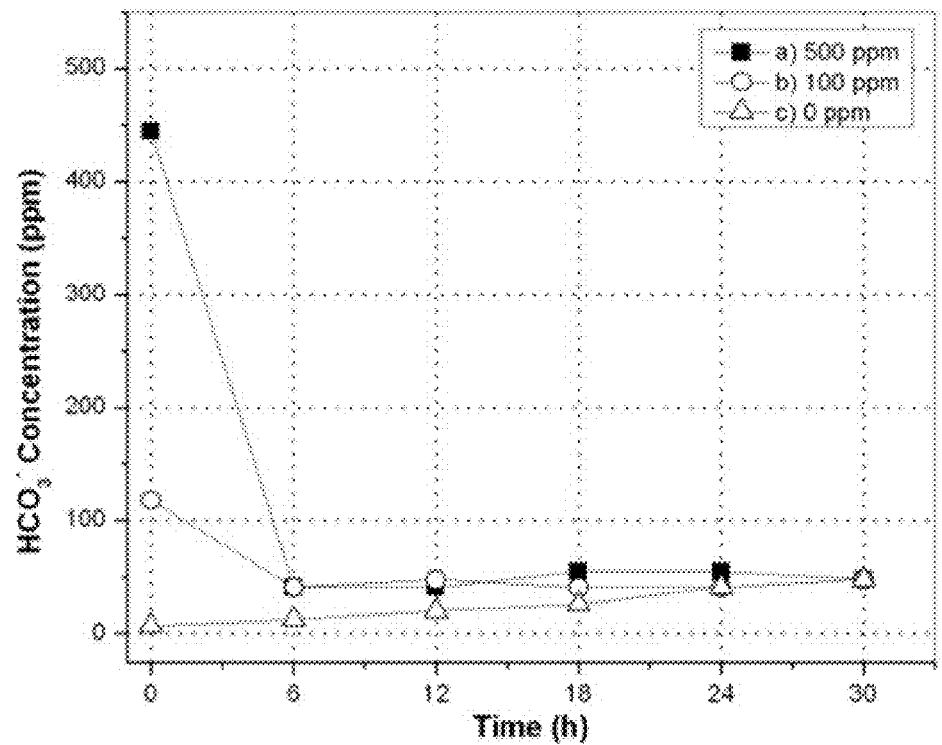
FIG. 12B shows the bicarbonate ion concentration over time for Tests (a), (b), and (c).
Figure 12C:
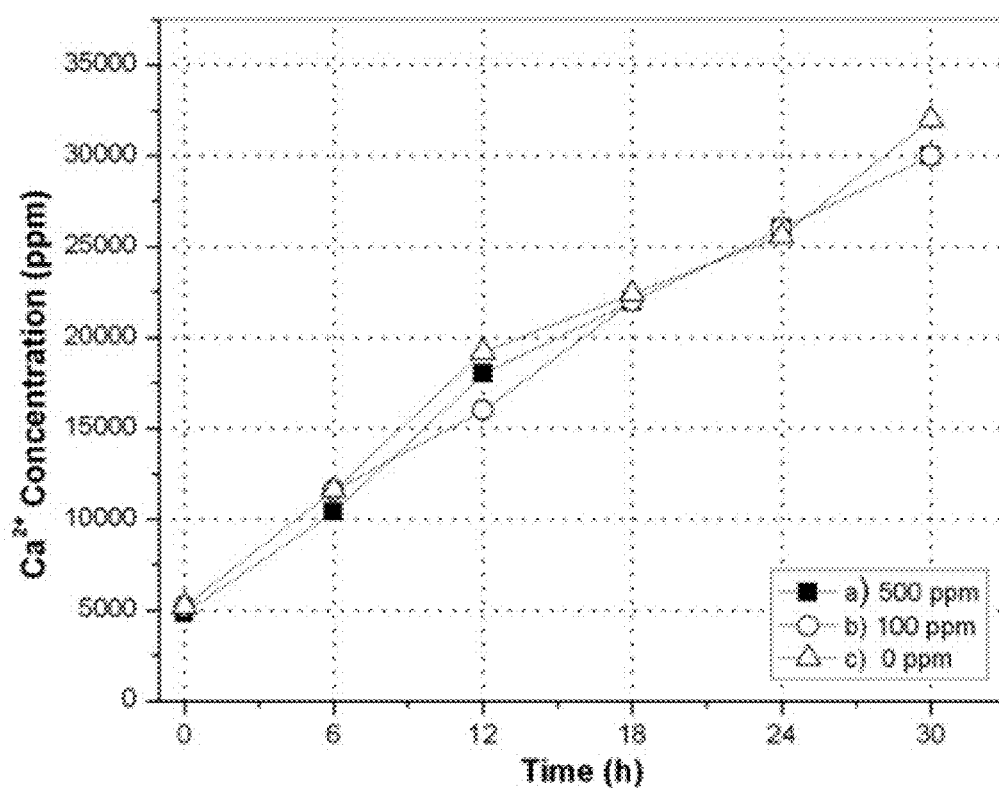
FIG. 12C shows the calcium ion concentration over time for Tests (a), (b), and (c). In each case, the conditions of Tests (a), (b), and (c) are described in Table 2A.

FIGS. 12A to 12C show variations in pH, bicarbonate ion and calcium ion concentrations over time for the three test cases. The pH dropped by 0.25 and 0.34 in fouling tests (a) and (b), respectively, reflecting the loss of bicarbonate ions due to heating, whereas pH remained almost constant in fouling test (c) because there were almost no bicarbonate ions to lose. The bicarbonate ion concentration significantly dropped in the first 6 h in fouling tests (a) and (b) due to the intense heating in water (i.e., see FIG. 12B). The calcium ion concentration almost linearly increased with time for all three cases as expected.

Discussion

The present study explored the potential for a robust strategy utilizing high voltage plasma discharge to remove carbonate hardness (by reducing bicarbonate concentration), while allowing for extremely high concentrations of calcium ions, especially in produced water treatment and desalination. This approach to fouling prevention has the potential for application in the treatment of very complex wastewaters, which upon undergoing a thermal process such as distillation, can result in profound fouling crystallization problems with a negative impact on fluid processing equipment. The best plasma GAD system in this study was plasma test 12 (see Table 1), which was capable of bringing bicarbonate concentration of the 650 mL of water from almost 700 ppm to 83 ppm within 10 minutes. In addition, plasma test 12 showed that bicarbonate content could be completely removed within 20-min GAD-treatment time.

The results presented in the fouling component of this study showed that given extremely high concentration of calcium ions, i.e. 5,000 ppm, and bicarbonate level as low as 7 ppm, the thickness of the $CaCO_3$ layer on a 1 kw heater was under 0.03 mm as compared to a 1.85 mm thick layer for the case of a 445 ppm bicarbonate concentration. The fouling component of this study also provides experimental trendline data on the duration of time required to form scale given the aforementioned initial conditions of sample waters and system operating conditions.

While it is well-known that $CaCO_3$ scale is caused by the combination of calcium ions and bicarbonate ions, to date, strategies for preventing formation of scale often emphasize removing hardness by reducing calcium content such as through reverse osmosis, ion exchange, the addition of soda ash ($Na_2CO_3$) or even electrochemical processes. In produced water, the concentration of calcium ions is often extremely high [1] such that its removal is generally impractical. Accordingly, the removal of bicarbonate ions is an alternative strategy for the purpose of softening. Conventionally, the removal of bicarbonate ions in hard water is accomplished by adding lime (CaO). However, this chemical approach increases the overall mass of solids which ultimately need to be disposed reflecting a concomitant increase in cost.

The present study introduces a new fouling prevention method using a plasma discharge as a non-chemical device targeting bicarbonate in produced water. Since the plasma arc discharge generates intense, highly localized heating, the arc can been utilized to remove bicarbonate ions in produced water as shown in this study. The fouling problems associated with $CaCO_3$ particles are caused when both calcium ion and bicarbonate ion are present in water. By dissociating and releasing bicarbonate, this plasma-based methodology removes one of two key culprits in the fouling process without addition of other solid materials as in chemical treatment. The present study utilized a non-chemical, clean technology for removing bicarbonate ions in produced water. Subsequently, using fouling tests with artificially hardened municipal and distilled water, bicarbonate control was verified as a mechanism for $CaCO_3$ fouling prevention.

Without intending to be bound by the correctness or incorrectness of any particular theory of operation, one proposed mechanism for the modulation of bicarbonate by plasma in water is the effect of intense, highly localized heating (or "stochastic heating") which dissociates bicarbonate ions to hydroxyl ions ($OH^-$) and $CO_2$ (gas). Subsequently, the hydroxyl ions react with other bicarbonate ions, producing carbonate ions ($CO_3^{2-}$), which react with $Ca^{2+}$ to form $CaCO_3$ particles. However in the present case, the generation of $H^+$ ions in water by plasma GAD is also capable of removing bicarbonate ions by converting them to $H_2O$ and $CO_2$ (gas). This reaction in plasma treated produced water may provide the basis for a new non-chemical fouling prevention method.

Figure 11A:
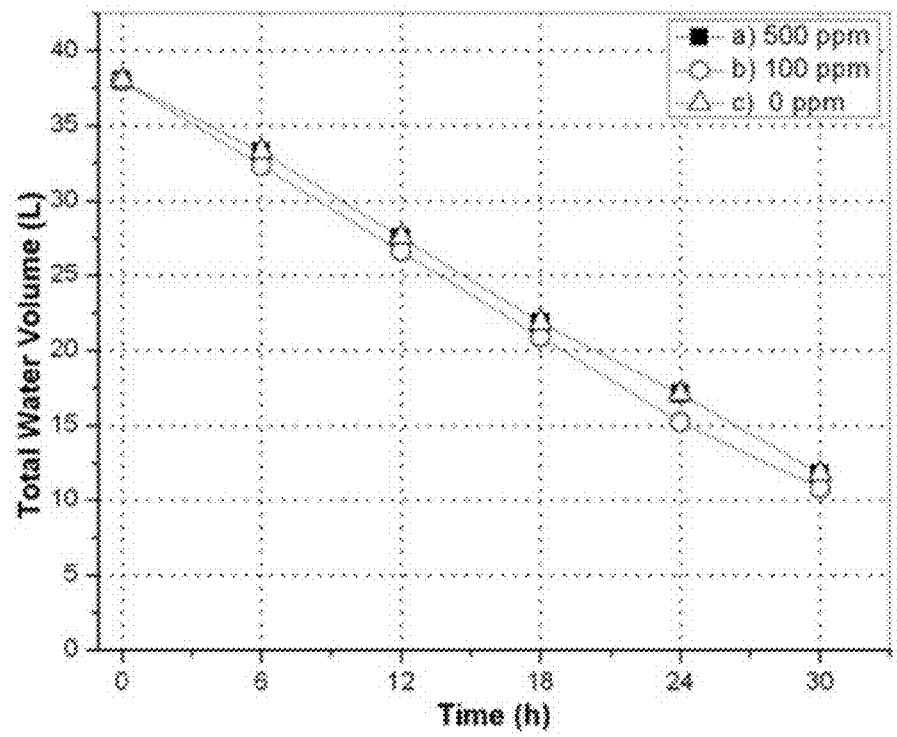
FIG. 11A shows the total water volume over time for Tests (a), (b), and (c).
Figure 11B:
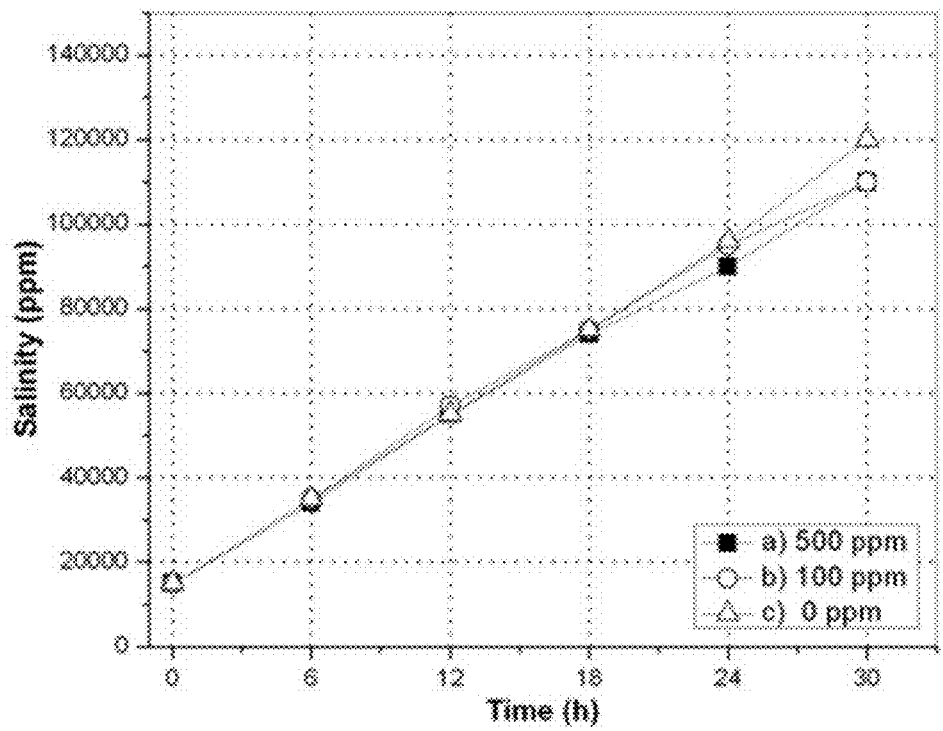
FIG. 11B shows the salinity over time for Tests (a), (b), and (c).
Figure 11C:
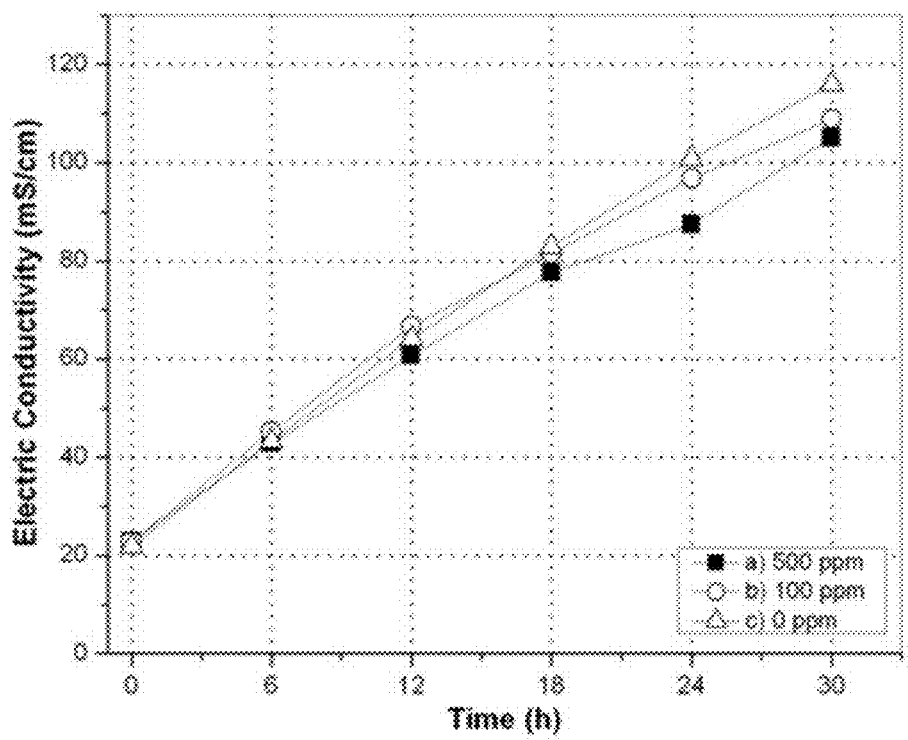
FIG. 11C shows the conductivity over time for Tests (a), (b), and (c).
Figure 11D:
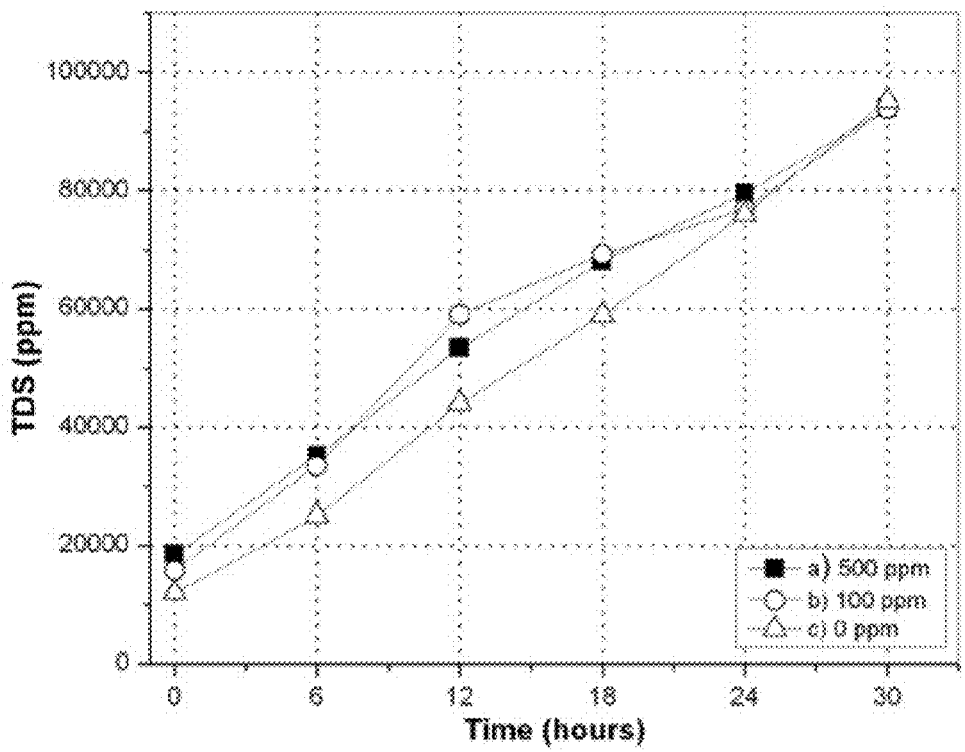
FIG. 11D shows the TDS over time for Tests (a), (b), and (c). In each case, the conditions of Tests (a), (b), and (c) are described in Table 2A.

For the fouling tests, the bicarbonate ion concentrations significantly dropped in the first 6 h in tests (a) and (b) (see FIG. 11B). Heating during these tests resulted in dissociation of bicarbonate ions into $OH^-$ ions and $CO_2$ gas, in a similar but less efficient manner than as described in the proposed plasma mechanism. In the case of the fouling test, the last reaction of the formation of $CaCO_3$ particles takes place on the surface of the heating element in the form of precipitation fouling. Thus, although the bicarbonate ion concentrations were below 50 ppm after t=6 h, the $CaCO_3$ particles suspended in water continued to adhere to the surface of the heating element, increasing the scale thickness on the heating element over time in fouling tests (a) and (b).

As those skilled in the art will appreciate, numerous modifications and variations of the present invention are possible in light of these teachings, and all such are contemplated hereby. For example, in addition to the embodiments described herein, the present invention contemplates and claims those inventions resulting from the combination of features of the invention cited herein and those of the cited prior art references which complement the features of the present invention. Similarly, it will be appreciated that any described material, feature, or article may be used in combination with any other material, feature, or article, and such combinations are considered within the scope of this invention.

The disclosures of each patent, patent application, and publication cited or described in this document are hereby incorporated herein by reference, each in its entirety.

What is claimed:

1. A method of treating adulterated water, said adulterated water having an initial level of bicarbonate ion of at least about 250 ppm and an initial level of calcium ion of at least 500 ppm, said method comprising:
   (a) contacting the adulterated water with a non-thermal plasma to produce plasma treated water having a level of bicarbonate ion of less than about 100 ppm, wherein the non-thermal plasma is formed with the coincident injection of air, oxygen, or a combination thereof; and
   (b) optionally distilling the plasma treated water.

2. The method of claim 1, further comprising distilling the plasma treated water.

3. The method of claim 1, the adulterated water being flowback water or water produced during hydraulic fracturing of shale rock during oil or natural gas drilling.

4. The method of claim 1, the adulterated water having an initial level of bicarbonate ion in the range of from about 500 ppm to about 5,000 ppm.

5. The method of claim 4, the adulterated water having an initial level of bicarbonate ion in the range of from about 1,000 ppm to about 5,000 ppm.

6. The method of claim 1, the plasma treated water having a bicarbonate ion level less than about 50 ppm.

7. The method of claim 6, the plasma treated water having a bicarbonate ion level in the range of from about 10 ppm to about 50 ppm.

8. The method of claim 1, the non-thermal plasma being generated by a gliding arc discharge.

9. The method of claim 1, the non-thermal plasma being generated by a spark discharge.

10. The method of claim 9, spark discharge being generated by a plurality of high voltage pulses at a rate in a range of from about 1 to about 2000 pulses per second.

11. The method of claim 9, spark discharge being generated by a plurality of high voltage pulses, each pulse having a duration in a range of from about 10 nanosecond to about 10 microseconds.

12. The method of claim 9, spark discharge being generated by a plurality of high voltage pulses, each pulse having an intensity in a range of about 10 J to about 500 J per pulse.

13. The method of claim 1, wherein the contacting the adulterated water with the non-thermal plasma comprises using the water as an electrode to generate the plasma.

14. The method of claim 1, wherein the contacting the adulterated water with the non-thermal plasma comprises injecting the adulterated water into a plasma zone generated between two electrodes.

15. The method of claim 1, further comprising removing solids from the plasma treated water.

16. The method of claim 15, the removing of solids from the plasma treated water being accomplished by filtering.

* * * * *